Sept. 23, 1958　　　R. M. BARRER ET AL　　　2,853,365
DISPROPORTIONATION OF NITRIC OXIDE USING
CRYSTALLINE ZEOLITES AS CATALYSTS
Filed Feb. 7, 1955
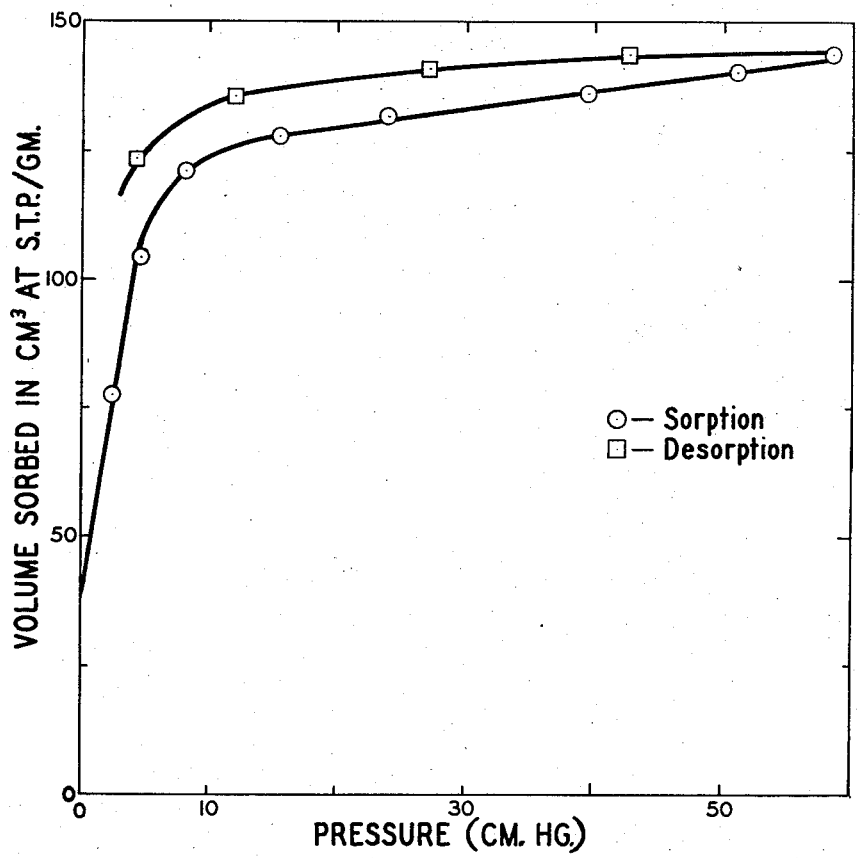
INVENTORS
RICHARD M. BARRER
WILLIAM E. ADDISON
BY
ATTORNEY

2,853,365

DISPROPORTIONATION OF NITRIC OXIDE USING CRYSTALLINE ZEOLITES AS CATALYSTS

Richard M. Barrer, Bromley, and William E. Addison, Bramcote, Beeston, England, assignors to Union Carbide Corporation, a corporation of New York Application February 7, 1955, Serial No. 486,444

12 Claims. (Cl. 23—157)

This invention relates to the production of nitrogen oxides and more particularly to the disproportionation of nitric oxides to form nitrous oxide.

Nitrous oxide ($N_2O$) is used commercially as an anesthetic and bleaching agent. The disproportionation of nitric oxide (NO) has been accomplished in the gas phase at room temperature but at an excessively slow rate. Nitrous oxide may also be produced from the decomposition of ammonium nitrate ($NH_4NO_3$) in the presence of phosphorous but this process has proven to be very hazardous and is not readily adaptable to large scale operation. Furthermore, one of the primary difficulties of the disproportionation reactions to form nitrogen oxides from nitric oxide has been in the separation of the final reaction products.

The primary object of the present invention is to provide improved means for producing nitrous oxide and higher nitrogen oxides from nitric oxide in high yields.

Another object of the present invention is to provide a process for the separation, in an efficient manner, of the products formed by the disproportionation of nitric oxide.

A further object of the present invention is to provide a safe and efficient process for the production of nitrogen oxides and more particularly the production of nitrous oxides.

A still further object of the present invention is to provide an improved process for the production of nitrous oxide from nitric oxide whereby the reaction rate is exceedingly high.

According to the process of this invention, nitric oxide is sorbed in at least partially dehydrated crystalline zeolites and is thereby disproportionationed to form nitrous oxide and higher nitrogen oxides. This process may proceed at atmospheric pressure and low temperature and still obtain good yields of nitrous oxide from the sorbed nitric oxide.

More particularly, the process of the invention is described as follows: Nitric oxide (NO) is sorbed in a crystalline zeolite at relatively low temperatures and undergoes a rapid disproportionation to form nitrogen peroxide ($N_2O_3$) and nitrous oxide ($N_2O$). While this reaction proceeds over a wide range of temperature, the preferred temperature range is below about $-63.5°$ C. with a useful temperature range as high as $0°$ C.

An advantage of the present process is the convenient method of product separation by desorption of the crystalline zeolite. The desorption process proceeds with temperatures up to and above $150°$ C. subsequent to the sorption period at relatively low temperatures. During the desorption process, nitrous oxide is liberated from the crystalline zeolite as the temperature is increased up to about $150°$ C. The nitrogen peroxide, however, remains stable in the crystalline zeolite during the nitrous oxide desorption period. When a temperature of approximately $150°$ C. is reached, the nitrogen peroxide disproportionates into nitrogen dioxide ($NO_2$) and nitric oxide. The nitric oxide may be removed concurrently with an increase in temperature above about $150°$ C. while the nitrogen dioxide remains sorbed in the crystalline zeolite. The sorbed nitrogen dioxide may be removed upon further heating to a temperature of about $200°$ C.

The reaction mechanism for the sorbed nitric oxide is formulated as follows:

(1) $$4NO \rightleftarrows N_2O + N_2O_3$$

The reaction of a measured amount of nitric oxide sorbed in the naturally occurring crystalline zeolite, chabazite, at a temperature of $-183°$ C., followed by desoprtion with temperatures up to about $150°$ C., has shown conclusively that the reaction is operative. The desorbed gases were collected and analyzed quantitatively through combined mensuration of gas volumes and vapor densities. The amount of nitrous oxide obtained was never more than one quarter of the initial amount of nitric oxide sorbed, and usually this amount of nitrous oxide was nearly exactly a quarter of the initial charge.

Reaction time and quantitative product separation were analyzed and the following table was prepared. Nitric oxide was sorbed in the crystalline zeolite, chabazite, for each of the six runs at a temperature of about $-183°$ C. followed by desorption at temperatures up to about $150°$ C. The reaction time and the amount of nitric oxide sorbed was varied for each run and the resultant recovery of nitrous oxide recorded. The recovery for each of the six runs is recorded as the ratio of nitric oxide initially sorbed to nitrous oxide liberated, volume of nitrous oxide recovered and the volumetric percent decomposition of the sorbed nitric oxide.

TABLE I

Extent of reaction $4NO \rightleftarrows N_2O + N_2O_3$ 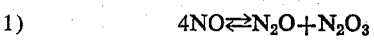 in chabazite following sorption of NO at $-183°$ C.

| Run No. | Time (Hrs.) | Amount NO sorbed (cc. S. T. P./g.) | Ratio, NO/$N_2O$ | Vol. $N_2O$ Recovered, cc. S. T. P./g. | Vol. Percent Decomp. of NO |
|---|---|---|---|---|---|
| 1 | 1/60 | 49.63 | 4.09/1 | 12.14 | 97.8 |
| 2 | 24 | 47.83 | 4.07/1 | 11.76 | 98.3 |
| 3 | 168 | 48.86 | 4.05/1 | 12.06 | 98.8 |
| 4 | 336 | 50.05 | 4.05/1 | 12.35 | 98.7 |
| 5 | 24 | 17.06 | 4.07/1 | 4.19 | 98.2 |
| 6 | 24 | 95.90 | 4.05/1 | 23.68 | 98.8 |

The reaction of the sorbed nitric oxide is virtually complete however short the time of contact between the nitric oxide and the crystalline zeolite, chabazite, and over a wide range in the initial amount of nitric oxide sorbed. The high volumetric per cent decomposition of nitric oxide, sorbed in the crystalline zeolite, enables the production of large yields of nitrous oxide and higher nitrogen oxides. The reaction time involved in the decomposition of the nitric oxide is also an important advantage in the production of nitrous oxide since prior disproportionation in the gas phase at room temperature is excessively slow.

The ratio of nitric oxide initially sorbed to nitrous oxide desorbed indicates that the reaction is nearly complete in each run. This is evident from a typical run such as in run number two. According to Equation 1, for 47.83 cc. at S. T. P. of nitric oxide initially sorbed there would be required 11.96 cc. at S. T. P. of nitrous oxide desorbed. This is in close agreement with 11.76 cc. at S. T. P. actually obtained. But the desorptions at 150° C., although reaction according to Equation 1 was complete and so all the nitric oxide used up, always gave some nitric oxide in the desorbate. This apparent contradiction is due to the concurrent dissociation of a part of the nitrogen peroxide at 150° C. according to the following equation:

(2) $\qquad N_2O_3 \rightleftharpoons NO + NO_2$

The nitric oxide in the above equation is desorbed at a temperature of about 150° C., while the nitrogen dioxide remains occluded within the crystalline zeolite. The maximum yield of nitric oxide by dissociation of nitrogen peroxide ($N_2O_3$) would in the above run be 11.96 cc. at S. T. P., compared with an actual recovery of 9.57 cc. at S. T. P.

The effect of temperature upon the extent of decomposition according to Equation 1 is shown in Table II, in which are summarized data for sorption temperatures of nitric oxide. At −78° C. decomposition is as complete as when sorption occurs at −183° C., but the percent of nitric oxide disproportioned, though always high, is reduced at −22.5° C. and 0° C.

TABLE II

*Effect of temperature in the reaction* $4NO \rightleftharpoons N_2O + N_2O_3$ *in chabazite*

| Run.No. | Temp., °C. | Time, Hrs. | Amount NO Sorbed (cc. S. T. P./g.) | Vol. $N_2O$ Recovered (cc. S. T. P./g.) | Vol. Percent Decomp. of NO |
|---|---|---|---|---|---|
| 1 | 0 | 1 | 10.35 | 2.01 | 77.7 |
| 2 | −22.5 | 1 | 24.11 | 5.29 | 87.8 |
| 3 | −63.5 | 1 | 24.10 | 5.70 | 94.6 |
| 4 | −78 | 1 | 34.48 | 8.47 | 98.3 |
| 5 | −183 | 1/60 | 49.63 | 12.14 | 97.8 |

Disproportionation of nitric oxide may not have occurred at the sorption temperatures but during heating of the sorbent prior to desorption. The reaction begins to be incomplete when the nitric oxide is initially sorbed at −63.5° C. or above, and the actual disproportionation of nitric oxide occurred below −63.5° C. when sorption was initially at −78° C. or −183° C.

The disproportionation of nitric oxide was further studied in other crystalline zeolites having molecular sieve properties similar to that of chabazite. Naturally occurring crystalline silicates are called zeolites. The synthetic absorbents used in the process of the invention have compositions similar to some of the naturally occurring crystalline zeolites. There are, however, significant differences between the synthetic and natural materials. One of the synthetic crystalline sodium-aluminum-silicates and its derivatives used in the process of the invention, have been designated by the term "zeolite X" and are described in detail in the copending application, Serial No. 400,389 filed December 24, 1953. A method of making the absorbent is disclosed in the same application.

Zeolite X consists basically of a three-dimensional framework of $SiO_4$ and $AlO_4$ tetrahedra. The tetrahedra are cross linked by the sharing of oxygen atoms so that the ratio of oxygen atoms to the total of the aluminum and silicon atoms is equal to two or $$O/(Al+Si) = 2$$

The electrovalence of each tetrahedra containing aluminum is balanced by the inclusion in the crystal of a cation, for example an alkali or alkaline earth metal ion. One cation may be exchanged for another by conventional ion exchange techniques. Thus the cation, sodium, in the sodium aluminum-silicate may be replaced by an alkali or alkaline earth metal ion, such as calcium, and the calcium aluminum-silicate formed. The calcium aluminum-silicate, used in the process of the invention, is designated for convenience as "calcium zeolite X" or "calcium X."

Zeolite X may be distinguished from other zeolites and silicates on the basis of its X-ray powder diffraction pattern and certain physical characteristics. The composition and density are among the characteristics which have been found to be important in identifying zeolite X.

The formula for all crystalline zeolites, where "M" represents a metal and "n" its valence is represented as follows:

$$\frac{M_2O}{n}: Al_2O_3: XSiO_2: YH_2O$$

where the coefficient of the metal oxide is assumed to be one. More specifically for zeolite X, the metal oxide coefficient is taken within the range of 0.9±0.2. In general, a particular crystalline zeolite will have values for X and Y that fall in a definite range. Numerous analyses have further shown that an average value of X for zeolite X is about 2.5 and that the X value falls within the range of 2.5±0.5. The value for Y is dependent upon the degree of hydration. This value may be as high as 8 for some forms of zeolite X and has been determined to be a maximum of 6.2 for sodium zeolite X by heating fully hydrated sodium zeolite X to 500° C. at about 0.1 millimeter pressure. The value of Y for completely dehydrated zeolite X will be zero. The ionic exchanged calcium zeolite X has a Y value of about 6.4. More particularly then the formula for zeolite X may be written as follows:

$$0.9 \pm 0.2 \frac{M_2O}{n}: Al_2O_3: 2.5 \pm 0.5 SiO_2: YH_2O$$

The X-ray powder diffraction pattern has been found to be a useful tool in identifying zeolite X. In obtaining the X-ray powder diffraction patterns given below, standard techniques were employed. The radiation was the Kα doublet of copper, and a Geiger counter spectrometer with a strip chart pen recorder was used. The peak heights, I, and the positions as a function of 2θ, where θ is the Bragg angle, were read from the spectrometer chart. From these the relative intensities $$\frac{100 I}{I_0}$$

where $I_0$ is the intensity of the strongest line or peak and d(obs), the interplanar spacing in A., corresponding to the recorded lines were calculated.

X-ray powder diffraction data for sodium zeolite X and calcium zeolite X are given in Table A. The table lists the 100 $I/I_0$ and the d values in A. for the observed lines. In a separate column are listed the sum of the squares of the Miller indices $(h^2+k^2+l^2)$ for a cubic unit cell corresponding to the observed lines in the X-ray diffraction patterns. The X-ray patterns indicate a cubic unit cell of $a_0$ of about 24.99 A. for sodium zeolite X and about 24.90 A. for calcium zeolite X.

TABLE A

| Na₂X | | | CaX | | |
|---|---|---|---|---|---|
| $h^2+k^2+l^2$ | 100 I/I₀ | d(obs in A.) | $h^2+k^2+l^2$ | 100 I/I₀ | d(obs in A.) |
| 3 | 100 | 14.47 | 3 | 100 | 14.37 |
| 8 | 18 | 8.85 | 8 | 9 | 8.79 |
| 11 | 12 | 7.54 | 11 | 4 | 7.51 |
| 19 | 18 | 5.73 | | | |
| 27 | 5 | 4.81 | | | |
| 32 | 9 | 4.42 | 19 | 16 | 5.71 |
| 35 | 1 | 4.23 | 27 | 5 | 4.79 |
| 40 | 4 | 3.946 | 32 | 11 | 4.40 |
| 43 | 21 | 3.808 | | | |
| 44 | 3 | 3.765 | | | |
| 48 | 1 | 3.609 | 40 | 2 | 3.936 |
| 51 | 1 | 3.500 | 43 | 20 | 3.800 |
| 56 | 18 | 3.338 | 44 | 2 | 3.754 |
| 59 | 1 | 3.253 | 48 | 2 | 3.593 |
| 67 | 4 | 3.051 | 51 | 2 | 3.486 |
| 72 | 9 | 2.944 | 56 | 12 | 3.328 |
| 75 | 19 | 2.885 | 59 | 3 | 3.241 |
| 80 | 8 | 2.794 | 67 | 4 | 3.041 |
| 83 | 2 | 2.743 | | | |
| 88 | 8 | 2.663 | 72 | 8 | 2.934 |
| 91 | 3 | 2.620 | 75 | 6 | 2.875 |
| 96 | 1 | 2.550 | | | |
| | | | 80 | 7 | 2.783 |
| 108 | 5 | 2.404 | 83 | 4 | 2.732 |
| 123 | 1 | 2.254 | 88 | 6 | 2.653 |
| 128 | 3 | 2.209 | 91 | 4 | 2.610 |
| 131 | 3 | 2.182 | | | |
| 136 | 2 | 2.141 | | | |
| 139 | 2 | 2.120 | 104 | 1 | 2.440 |
| 144 | 1 | 2.083 | | | |
| | | | 108 | 5 | 2.396 |
| 164 | 1 | 1.952 | | | |
| 168 | 1 | 1.928 | 128 | 3 | 2.202 |
| | | | 131 | 2 | 2.175 |
| 184 | 1 | 1.842 | 136 | 3 | 2.139 |
| | | | 139 | 2 | 2.112 |
| 195 | 1 | 1.789 | | | |
| 200 | 2 | 1.767 | 144 | 1 | 2.074 |
| 211 | 3 | 1.721 | 155 | 1 | 2.000 |
| 243 | 3 | 1.603 | | | |
| | | a₀ 24.99 A. | 164 | 1 | 1.945 |
| | | | 168 | 1 | 1.921 |
| | | | 179 | 1 | 1.859 |
| | | | 187 | 1 | 1.821 |
| | | | 195 | 1 | 1.784 |
| | | | 200 | 2 | 1.761 |
| | | | 211 | 2 | 1.714 |
| | | | 243 | 3 | 1.597 |
| | | | | | a₀ 24.90 A. |

The more significant d values for zeolite X are given in Table B.

TABLE B
*d Value of reflection in A.*

14.42±0.2
8.82±0.1
4.41±0.05
3.80±0.05
3.33±0.05
2.88±0.05
2.79±0.05
2.66±0.05

Zeolite X may be defined as a synthetic crystalline aluminum-silicate having an X-ray powder diffraction pattern characterized by at least those reflections set forth in either Table A or Table B and having a chemical composition represented by the following formula:

$$0.9 \pm 0.2 \frac{M_2O}{n} : Al_2O_3 : 2.5 \pm 0.5 SiO_2 : YH_2O$$

wherein "M" represents at least one cation having a valence of not more than three, "n" represents the valence of "M" and "Y" may be any value up to about 8.

A third synthetic crystalline aluminum-silicate, sodium zeolite A or sodium A, was studied in the disproportionation of nitric oxide. Sodium zeolite A is described in detail in the copending application, Serial No. 400,388, filed December 24, 1953. A method of making the absorbent is disclosed in the same application. Sodium zeolite A (Na₂A) has the following formula:

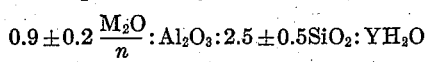

In this formula "Y" in the completely dehydrated form of the absorbent is essentially zero. The fully hydrated form of the absorbent has a "Y" value of about 5.1. Sodium zeolite A, fully hydrated, has an apparent density of between 1.89 and 2.09 grams per cubic centimeter and a cubic unit cell in which $a_0$ equals about 12.3 A.

The X-ray powder diffraction patterns has also been useful in identifying sodium zeolite A. The X-ray powder diffraction data for sodium zeolite A is given in Table C. The table lists the 100 I/I₀ and the d values in A. for the observed line. The X-ray patterns indicate a cubic unit cell of $a_0$ of about 12.3 A. In a separate column are listed the sum of the squares of the Miller indices $$(h^2+k^2+l^2)$$

for a cubic unit cell corresponding to the observed lines in the X-ray diffraction patterns. The $a_0$ value and the estimated errors in reading the position of an X-ray peak on the spectrometer chart, are also tabulated.

TABLE C

*Na₂A*

| $(h^2+k^2+l^2)$ | d(obs in A.) | 100 I/I₀ | Estimated Error in d Value |
|---|---|---|---|
| 1 | 12.29 | 100 | ±0.02 |
| 2 | 8.71 | 69 | ±0.02 |
| 3 | 7.11 | 35 | ±0.01 |
| 5 | 5.51 | 25 | ±0.01 |
| 6 | 5.03 | 2 | ±0.01 |
| 8 | 4.36 | 6 | ±0.01 |
| 9 | 4.107 | 36 | ±0.004 |
| 11 | 3.714 | 53 | ±0.003 |
| 13 | 3.417 | 16 | ±0.003 |
| 14 | 3.293 | 47 | ±0.002 |
| 17 | 2.987 | 55 | ±0.002 |
| 18 | 2.904 | 9 | ±0.002 |
| 20 | 2.754 | 12 | ±0.002 |
| 21 | 2.688 | 4 | ±0.002 |
| 22 | 2.626 | 22 | ±0.002 |
| 24 | 2.515 | 5 | ±0.002 |
| 25 | 2.464 | 4 | ±0.002 |
| 27 | 2.371 | 3 | ±0.002 |
| 29 | 2.289 | 1 | ±0.002 |
| 30 | 2.249 | 3 | ±0.002 |
| 32 | 2.177 | 7 | ±0.002 |
| 33 | 2.144 | 10 | ±0.001 |
| 34 | 2.113 | 3 | ±0.001 |
| 35 | 2.083 | 4 | ±0.001 |
| 36 | 2.053 | 9 | ±0.001 |
| 41 | 1.924 | 7 | ±0.001 |
| 42 | 1.901 | 4 | ±0.001 |
| 44 | 1.858 | 2 | ±0.001 |
| 45 | 1.837 | 3 | ±0.001 |
| 49 | 1.759 | 2 | ±0.001 |
| 50 | 1.743 | 13 | ±0.001 |
| 53 | 1.692 | 6 | ±0.001 |
| 54 | 1.676 | 2 | ±0.001 |
| 57 | 1.632 | 4 | ±0.001 |
| 59 | 1.604 | 6 | ±0.001 |
| 61 | 1.577 | 4 | ±0.001 |
| 65 | 1.528 | 2 | ±0.001 |
| 66 | 1.516 | 1 | ±0.001 |
| 69 | 1.483 | 3 | ±0.001 |
| 70 | 1.473 | 2 | ±0.001 |
| 74 | 1.432 | 3 | ±0.001 |
| 75 | 1.422 | 2 | ±0.001 |
| 77 | 1.404 | 5 | ±0.001 |
| 81 | 1.369 | 2 | ±0.001 |
| 82 | 1.360 | 8 | ±0.001 |
| $a_0$ 12.32 ±0.02 A. | | | |

The more significant d values for zeolite A are given in Table D.

TABLE D

*d Value of reflection in A.*

12.2±0.2
8.6±0.2
7.05±0.15
4.07±0.08
3.68±0.07
3.38±0.06
3.26±0.05
2.96±0.05
2.73±0.05
2.60±0.05

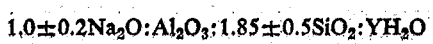

The data in Table D represent average values for a number of ion exchanged forms of zeolite A.

Zeolite A may be defined as a synthetic crystalline aluminum-silicate having an X-ray powder diffraction pattern characterized by at least those reflections set forth in either Table C or Table D. Zeolite A has a chemical composition represented by the following formula:

$$1.0 \pm 0.2 \frac{M_2O}{n} : Al_2O_3 : 1.85 \pm 0.5 SiO_2 : YH_2O$$

wherein "M" represents at least one of the materials in the groups consisting of hydrogen, ammonium, metals in groups I and II of the periodic table, and the transition metals of the periodic table, "$n$" represents the valence of "M," and Y may be any value up to about 6.

In the disproportionation of nitric oxide sorbed in crystalline zeolites, the natural materials calcium-rich chabazite and sodium-rich chabazite were employed along with the synthetic materials described above. The order of openness among the zeolites studied, based on molecular sieve experiments was: sodium X, calcium X, calcium-rich chabazite, sodium-rich chabazite, and sodium A. The disproportionation reaction of the above materials was studied after sorption at 0° C., by the procedures used with chabazite. The results have been tabulated in Table III showing the volume of nitric oxide sorbed in the crystalline zeolite, the volume of nitrous oxide recovered, and the volumetric percent reaction of the sorbed nitric oxide. All the crystalline zeolites were very effective, the least effective being the less open structure Sodium A.

TABLE III

Extent of reaction $4NO \rightleftharpoons N_2O_3 + N_2O$ following sorption of NO at 0° C. in various zeolites

| Sorbent | Vol. of NO Sorbed (cc. S. T. P./g.) | Vol. N₂O Recovered (cc. S. T. P./g.) | Vol. Percent Reaction |
|---|---|---|---|
| Calcium X | 21.45 | 4.82 | 89.7 |
| Sodium X | 22.50 | 4.08 | 78.2 |
| Calcium-rich Chabazite | 16.03 | 3.18 | 79.3 |
| Sodium-rich Chabazite | 15.68 | 3.52 | 91.3 |
| Sodium A | 16.31 | 1.07 | 34.5 |

The intracrystalline environment of the zeolites, due to their polar surroundings and comparatively intense fields of force within the crystals, is especially favorable in promoting reactivity.

In an example of the invention 150 cc. at S. T. P./g. of nitric oxide were sorbed in the crystalline zeolite, chabazite, at a temperature of about 0° C. Reference is made to the single figure of the accompanying drawing which illustrates the sorption and desorption curves of nitric oxide sorbed in chabazite at 0° C. The sorption of nitric oxide was irreversible as shown by the sorption-desorption curves. The difference in the sorption and desorption curves indicates that a different gas or gases are being desorbed from those sorbed in the crystalline chabazite. The gas from the isotherm was desorbed and collected in five fractions by freezing at −183° C. The first fraction consisted of the gas present in the gas phase. The second fraction with the exception of about 20% by volume, consisted of products desorbed directly from the chabazite, while for the other fractions the desorbate all came substantially from the chabazite. The fourth and fifth desorptions required heating the sorbent to a temperature of about 100° C. Vapor densities of the fractions were then determined and the results tabulated as follows:

| Fraction: | Vapor density |
|---|---|
| 1 | 17.51 |
| 2 | 19.04 |
| 3 | 20.32 |
| 4 | 17.91 |
| 5 | 18.02 |

From the above results it is evident that the desorbate contains a gas or gases which are heavier than the sorbed nitric oxide, having a vapor density equal to 15.00, and from the variable vapor density for each fraction, is a mixture of changing composition.

Each fraction was colorless and had a vapor pressure of pure nitric oxide, 2.7 mm. Hg at −183° C., thus indicating the presence of that gas. A formation of brown nitrogen dioxide gas from the nitric oxide was observed when air was admitted to each fraction. From the consideration of the starting material and of the above behavior, the gas or gases in admixture with the nitric oxide must: (1) contain only the elements oxygen and nitrogen, (2) be of substantially higher molecular weight than the nitric oxide, (3) have negligible vapor pressure at −183° C., and (4) be colorless whether solid or gas. Nitrous oxide fulfills these conditions, and the desorbate should be a binary mixture of nitric oxide and nitrous oxide. The presence of nitrous oxide was established by oxidizing all the nitric oxide to nitrogen dioxide with excess air, freezing at −183° C., pumping away the incondensible nitrogen and excess oxygen and fractionating the condensate at a temperature of about −78° C. At this temperature the nitrous oxide was freed of any traces of nitrogen dioxide and had an actual vapor density of 22.02 as verified with the theoretical value equal to 22.01.

Since nitrous oxide cannot for reasons of material balance be the sole decomposition product from nitric oxide, a higher oxide must have remained occluded in the crystalline chabazite even at a temperature of 100° C. A sixth fraction was therefore desorbed and collected at −183° C. by raising the temperature of the chabazite progressively to about 400° C. This desorbate was a brown gas condensing to a blue liquid and finally to a blue solid. At room temperature a vapor density of 35.8±0.3 was established indicating that the gas contained nitrogen dioxide.

From the above evidence and results, it is conclusively shown that nitric oxide sorbed in a crystalline zeolite undergoes a disproportionation according to the following formula:

$$4NO \rightleftharpoons N_2O + N_2O_3$$

The process of the invention provides a safe and efficient means for the production of nitrous oxide, as well as higher nitrogen oxides, in improved yields from nitric oxide sorbed in at least partially dehydrated crystalline zeolites with the additional utility of a convenient method of product separation.

What is claimed is:

1. A process for disproportionating nitric oxide to form nitrous oxide and higher nitrogen oxides, which process comprises providing a quantity of at least partially dehydrated crystalline zeolites, sorbing said nitric oxide in said crystalline zeolite at a temperature of below about 0° C. to effect the decomposition of said nitric oxide into the geaseous-component mixture of said nitrous oxide and nitrogen peroxide, desorbing said gaseous-component mixture by heating up to a temperature of about 150° C. to liberate said nitrous oxide, desorbing said nitrogen peroxide by heating above a temperature of about 150° C. to effect the decomposition of said nitrogen peroxide into the gaseous-component mixture of nitrogen dioxide and nitric oxide, and removing said nitrogen dioxide from said crystalline zeolite by heating to temperatures up to about 200° C.

2. A process for disproportionating nitric oxide to form nitrous oxide and higher nitrogen oxides, which process comprises providing a quantity of at least partially dehydrated crystalline zeolites, sorbing said nitric oxide in said crystalline zeolite at a temperature of below about −63° C. to effect the decomposition of said nitric oxide into the gaseous-component mixture of said nitrous oxide and nitrogen peroxide, desorbing said gaseous-component mixture by heating up to a temperature of about 150° C. to liberate said nitrous oxide, desorbing said nitrogen peroxide by heating above a temperature of about 150° C. to effect the decomposition of said nitrogen peroxide into the gaseous-component mixture of nitrogen dioxide and nitric oxide, and removing said nitrogen dioxide from said crystalline zeolite by heating to temperatures up to about 200° C.

3. A process for disproportionating nitric oxide to form nitrous oxide and higher nitrogen oxides, which process comprises providing a quantity of at least partially dehydrated naturally-occurring crystalline zeolities, sorbing said nitric oxide in said naturally occurring crystalline zeolite at a temperature of below about 0° C. to effect the decomposition of said nitric oxide into the gaseous-component mixture of said nitrous oxide and nitrogen peroxide, desorbing said gaseous-component mixture by heating up to a temperature of about 150° C. to liberate said nitrous oxide, desorbing said nitrogen peroxide by heating above a temperature of about 150° C. to effect the decomposition of said nitrogen peroxide into the gaseous-component mixture of nitrogen dioxide and nitric oxide, and removing said nitrogen dioxide from said naturally-occurring crystalline zeolite by heating to temperatures up to about 200° C.

4. A process for disproportionating nitric oxide to form nitrous oxide and higher nitrogen oxides, which process comprises providing a quantity of at least partially dehydrated naturally-occurring crystalline zeolites, sorbing said nitric oxide in said naturally-occurring crystalline zeolite at a temperature of below about −63° C. to effect the decomposition of said nitric oxide into the gaseous-component mixture of said nitrous oxide and nitrogen peroxide, desorbing said gaseous-component mixture by heating up to a temperature of about 150° C. to liberate said nitrous oxide, desorbing said nitrogen peroxide by heating above a temperature of about 150° C. to effect the decomposition of said nitrogen peroxide into the gaseous-component mixture of nitrogen dioxide and nitric oxide, and removing said nitrogen dioxide from said naturally-occurring crystalline zeolite by heating to temperatures up to about 200° C.

5. A process for disproportionating nitric oxide to form nitrous oxide and higher nitrogen oxides, which process comprises providing a quantity of at least partially dehydrated xeolite X, a crystalline aluminum-silicate having an arrangement of atoms such that the crystal's X-ray powder diffraction pattern is essentially the same as that tabulated in the following table:

d Value of reflection in A.

14.42±0.2
8.82±0.1
4.41±0.05
3.80±0.05
3.33±0.05
2.88±0.05
2.79±0.05
2.66±0.05 where the "d" values are the interplanar spacing in A., sorbing said nitric oxide in said zeolite X at a temperature of below about 0° C. to effect the decomposition of said nitric oxide into the gaseous-component mixture of said nitrous oxide and nitrogen peroxide, desorbing said gaseous-component mixture by heating up to a temperature of about 150° C. to liberate said nitrous oxide, desorbing said nitrogen peroxide by heating above a temperature of about 150° C. to effect the decomposition of said nitrogen peroxide into the gaseous-component mixture of nitrogen dioxide and nitric oxide, and removing said nitrogen dioxide from said zeolite X by heating to temperatures up to about 200° C.

6. A process for disproportionating nitric oxide to form nitrous oxide and higher nitrogen oxides, which process comprises providing a quantity of at least partially dehydrated sodium zeolite A, a crystalline sodium-alumino-silicate having an arrangement of atoms such that the crystal's X-ray powder diffraction pattern is essentially the same as that tabulated in the following table:

d Value of reflection in A.

12.2±0.2
8.6±0.2
7.05±0.15
4.07±0.08
3.68±0.07
3.38±0.06
3.26±0.05
2.96±0.05
2.73±0.05
2.60±0.05 where the "d" values are the interplanar spacing in A., sorbing said nitric oxide in said sodium zeolite A at a temperature of below about 0° C. to effect the decomposition of said nitric oxide into the gaseous-component mixture of said nitrous oxide and nitrogen peroxide, desorbing said gaseous-component mixture by heating up to a temperature of about 150° C. to liberate said nitrous oxide, desorbing said occluded nitrogen peroxide by heating above a temperature of about 150° C. to effect the decomposition of said nitrogen peroxide into the gaseous-component mixture of nitrogen dioxide and nitric oxide, and removing said nitrogen dioxide from said sodium zeolite A by heating to temperatures up to about 200° C.

7. A process for disproportionating nitric oxide to form nitrous oxide and higher nitrogen oxides, which process comprises providing a quantity of at least partially dehydrated zeolite A, a crystalline alumino silicate having an arrangement of atoms such that the crystal's X-ray powder diffraction pattern is essentially the same as that tabulated in the following table:

d Value of reflection in A.

12.2±0.2
8.6±0.2
7.05±0.15
4.07±0.08
3.68±0.07
3.38±0.06
3.26±0.05
2.96±0.05
2.73±0.05
2.60±0.05 where the "d" values are the interplanar spacing in A., sorbing said nitric oxide in said zeolite A at a temperature of below about 0° C. to effect the decomposition of said nitric oxide into the gaseous-component mixture of said nitrous oxide and nitrogen peroxide, desorbing said gaseous-component mixture by heating up to a temperature of about 150° C. to liberate said nitrous oxide, desorbing said occluded nitrogen peroxide by heating above a temperature of about 150° C. to effect the decomposition of said nitrogen peroxide into the gaseous-component mixture of nitrogen dioxide and nitric oxide, and removing said nitrogen dioxide from said zeolite A by heating to temperatures up to about 200° C.

8. A process for the catalytic disproportionation of nitric oxide to form nitrous oxide and higher nitrogen oxides, which process comprises providing a quantity of at least partially dehydrated sodium zeolite X, bringing said nitric oxide into intimate contact with said sodium zeolite X at a temperature of below about 0° C. and desorbing by heating to liberate said nitrous oxide and higher nitrogen oxides, said sodium zeolite X being a crystalline material having the following formula:

$$0.9 \pm 0.2 Na_2O : Al_2O_3 : 2.5 \pm 0.5 SiO_2 : YH_2O$$

where Y in the hydrated form may be any value up to about 6.2.

9. A process for the catalytic disproportionation of nitric oxide to form nitrous oxide and higher nitrogen peroxides, which process comprises providing a quantity of at least partially dehydrated calcium zeolite X, bringing said nitric oxide into intimate contact with said calcium zeolite X at a temperature of below about 0° C. and desorbing by heating to liberate said nitrous oxide and higher nitrogen oxides, said calcium zeolite X being a crystalline material having the following formula:

$$0.9 \pm 0.2 CaO : Al_2O_3 : 2.5 \pm 0.5 SiO_2 : YH_2O$$

where "Y" in the hydrated form may be any value up to about 6.4.

10. A process for the catalytic disproportionation of nitric oxide to form nitrous oxide and higher nitrogen oxides, which process comprises providing a quantity of at least partially dehydrated sodium zeolite A, bringing said nitric oxide into intimate contact with said sodium zeolie A at a temperature of about 0° C., and desorbing by heating to liberate said nitrous oxide and higher nitrogen oxides, said sodium zeolite A being a crystalline material having the following formula:

$$1.0 \pm 0.2 Na_2O : Al_2O_3 : 1.85 \pm 0.5 SiO_2 : YH_2O$$

wherein "Y" in the hydrated form may be any value up to about 5.1

11. A process for disproportionating nitric oxide to form nitrous oxide and higher nitrogen oxides, which process comprises providing a quantity of at least partially dehydrated crystalline, chabazite, sorbing said nitric oxide in said chabazite at a temperature of below about 0° C. to effect the decomposition of said nitric oxide into the gaseous-component mixture of said nitrous oxide and nitrogen peroxide, desorbing said gaseous-component mixture by heating up to a temperature of about 150° C. to liberate said nitrous oxide, desorbing said nitrogen peroxide by heating above a temperature of about 150° C. to effect the decomposition of said nitrogen peroxide into the gaseous-component mixture of nitrogen dioxide and nitric oxide, and removing said nitrogen dioxide from said chabazite by heating to temperatures up to about 200° C.

12. A process for disproportionating nitric oxide to form nitrous oxide and higher nitrogen oxides, which process comprises providing a quantity of at least partially dehydrated crystalline zeolite, said crystalline zeolite being at least one member of the group consisting of calcium zeolite X, sodium zeolite X, calcium-rich chabazite, sodium-rich chabazite and sodium zeolite A, sorbing said nitric oxide in said crystalline zeolite at a temperature of below about 0° C. to effect the decomposition of said nitric oxide into the gaseous-component mixture of said nitrous oxide and nitrogen peroxide, desorbing said gaseous-component mixture by heating up to a temperature of about 150° C. to liberate said nitrous oxide, desorbing said nitrogen peroxide by heating above a temperature of about 150° C. to effect the decomposition of said nitrogen peroxide into the gaseous-component mixture of nitrogen dioxide and nitric oxide, and removing said nitrogen dioxide from said crystalline zeolite by heating to temperatures up to about 200° C.

References Cited in the file of this patent

UNITED STATES PATENTS 2,159,528    Klingelhoefer _____ May 23, 1939